United States Patent
Mertens et al.

(10) Patent No.: US 7,407,058 B2
(45) Date of Patent: Aug. 5, 2008

(54) FILTER ELEMENT FOR FILTERING FLUIDS

(75) Inventors: Helmut Mertens, Riegelsberg (DE); Andreas Schunk, Waldmohr (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 461 days.

(21) Appl. No.: 10/519,471

(22) PCT Filed: May 23, 2003

(86) PCT No.: PCT/EP03/05385

§ 371 (c)(1), (2), (4) Date: Dec. 29, 2004

(87) PCT Pub. No.: WO2004/014518

PCT Pub. Date: Feb. 19, 2004

(65) Prior Publication Data

US 2005/0258092 A1    Nov. 24, 2005

(30) Foreign Application Priority Data

Jul. 24, 2002 (DE) .................................. 102 33 475

(51) Int. Cl.
*B01D 29/00* (2006.01)
*B01D 35/00* (2006.01)

(52) U.S. Cl. .................. 210/483; 210/485; 210/488; 210/417; 210/458; 210/315; 210/342; 210/437

(58) Field of Classification Search .......... 210/286, 210/315, 348, 497.1, 498, 497.01, 492, 489, 210/488, 485, 459, 438, 500, 421, 520
See application file for complete search history.

(56) References Cited

U.S. PATENT DOCUMENTS

| 360,441 A | | 4/1887 | Howes | |
|---|---|---|---|---|
| 813,327 A | * | 2/1906 | Schirmer | 210/351 |
| 879,197 A | * | 2/1908 | Schirmer | 210/417 |
| 2,865,510 A | * | 12/1958 | Greene | 210/315 |
| 3,750,889 A | | 8/1973 | Acosta | |
| 4,204,967 A | | 5/1980 | Bannister | |
| 5,104,534 A | * | 4/1992 | Branchcomb | 210/315 |
| 6,041,944 A | * | 3/2000 | Meier | 210/356 |
| 6,110,368 A | | 8/2000 | Hopkins et al. | |
| 6,554,139 B1 | * | 4/2003 | Maxwell et al. | 210/435 |
| 6,554,140 B2 | * | 4/2003 | Steger et al. | 210/438 |
| 7,059,481 B2 | * | 6/2006 | Kochert et al. | 210/437 |
| 7,108,139 B2 | * | 9/2006 | Nguyen | 210/437 |

FOREIGN PATENT DOCUMENTS

DE        94 08 546 U1    8/1994

(Continued)

*Primary Examiner*—Krishnan S. Menon
*Assistant Examiner*—Madeline Gonzalez
(74) *Attorney, Agent, or Firm*—Roylance, Abrams, Berdo & Goodman, L.L.P

(57) ABSTRACT

A filter element for filtering fluids has at least one filter unit (12, 14, 16) that is disposed concentrically around the axis of the element. The unit is supported on at least one supporting element (24, 26, 30) in the direction of the flow of the fluid. At least part of the supporting elements (24, 26) is provided, at least on the side facing the filter unit (12, 14, 16), with channels (28) for guiding the fluid. Longitudinal ribs (50) delimit the channels (28), and extend along the supporting element (24, 26) in the form of spiral tracks. The two free ends of each channel (28) emerge at opposite ends of the corresponding supporting element (24, 26). The channels (28) extend continuously along the supporting element, are devoid of multiple deviations in the fluid flow and only partially surround the corresponding supporting element (24, 28) to form a torsional guide for the fluid flow.

11 Claims, 3 Drawing Sheets

FOREIGN PATENT DOCUMENTS

| | | |
|---|---|---|
| DE | 44 30 341 A1 | 3/1995 |
| DE | 196 26 196 A1 | 1/1998 |
| DE | 198 37 257 A1 | 2/2000 |
| EP | 0 817 668 B1 | 12/2000 |
| FR | 2 782 019 A1 | 2/2000 |
| JP | 2001293312 A | 10/2001 |
| WO | WO 01/91881 A2 | 12/2001 |

* cited by examiner

FILTER ELEMENT FOR FILTERING FLUIDS

FIELD OF THE INVENTION

The present invention relates to a filter element for filtering fluids with at least one filter unit arranged concentrically around its longitudinal axis and supported in the direction of the respective throughflow of the fluid stream on at least one support element. At least some of the support elements are provided, at least on their side facing the filter unit, with channels for guiding the fluid. The channels extend with their longitudinal ribs which border them in spiral tracks along the support element. The respective channel, with its two free ends, emerges on the opposing ends of the respective support element.

BACKGROUND OF THE INVENTION

DE-A-198 37 257 discloses as a filter element a filter module which is simplified with respect to its structure and which enables production of a stage filter. Each layer of the filter medium as the filter unit has of a bed of deep-bed filter material. These beds alternate with spacers, having individual draining beds stacked together with the filter beds without gaps horizontally on top of one another transversely to the longitudinal axis of the filter module. The draining beds are sealed on alternate sides to the filtrate/unfiltered material chamber. With the known approach, any arrangement of filter beds is attainable.

By using beds both for the spacers and also for the filter layers, the known approach makes it possible to stack all beds horizontally without the need for separate support elements for example in the form of support tubes here, as is generally the case for conventional filter elements. Moreover, it is possible to stack any filter beds with different filter fineness in any sequence.

In practice, the known filter element can fail especially at high pressures of the fluid which is to be filtered, for example, because the deep-bed filter material beds cannot be adequately supported on the spacers in the form of draining beds. The latter can lead to failure of the entire filter element.

EP-B-0 817 668 discloses a filter device which preferably is designed as a bypass flow filter assembly and is used specifically for filtration of hydraulic oil supplies with a motor-driven pump and a permanently mounted filter housing which may be closed with a cover. The filter housing has an interchangeable filter element through which flow can take place from the inside to the outside and which has two cylindrical filter units arranged concentrically to its longitudinal axis. The filter units have a radial distance between themselves, and are held on the end side at least by different cover parts. The unfiltered material introduced between the radial spacing of the two filter units is routed in both directions through the respective filter unit, and is filtered in such a manner. Accordingly the filter units, with the formation of the generic prior art, are enclosed to the inside and to the outside by a support element in the form of a support tube facing the respective clean side of the known filter element. If the filter element is removed from the filter housing over the cover part of the known design, the filter housing forms a holding vessel for the dirty oil when the filter element is changed. No fouled fluid remains within the filter device. This arrangement would lead to dirt in the hydraulic circuit when the filter device is restarted. Although with respect to the inserted support elements in the form of support tubes, adequate and secure support of the actual filter units and of the filter material takes place such that failure of the filter element is precluded. The cylindrical support tubes on the inner and outer peripheral sides have only smooth guide surfaces between which passage points for the fluid are formed. Consequently, flow through the known support tubes takes place essentially transversely to their longitudinal alignment so that in the process fluid guidance is restricted. The known approach cannot be used for special filtration tasks, for example, if the intention is to eliminate fluid from the filter units with the filter material by drainage.

DE-A-44 30 341 discloses a generic filter element for filtration of fluid, with a hollow-cylindrical support element for a cup-shaped fluid filter which is closed with a removable cover, especially for oil or fuel. A filter housing receives an interchangeable filter unit. The filter unit has a length of filter material folded in a star-shape with end disks mounted on two filter material end sides to form a seal. The end disk is cover-shaped in the installation state of the filter unit forming a fluid opening. The pertinent support element prevents collapse of the filter unit as the fluid stream which is to be filtered flows through it in one direction. With this known approach, it is possible to leave the support element in the filter housing each time the filter unit is changed, so that it is not necessary to dispose of the support element which is not subject to wear together with the filter unit.

In order to achieve improved fluid guidance between the support element and the filter unit which encloses it, in one especially preferred embodiment provision is made such that the support projections are routed around the tubular support element in the manner of a 4-lead spiral along the outside periphery in order to repeatedly deflect the fluid stream around the longitudinal axis of the filter element by 360°. In this case, it is characteristic for the known embodiment of the support element that the support projections have sections with different pitches. In this way, a parallel arrangement of a total of four intermediate spaces with the shape of helical lines may be formed between the indicated support projections. These intermediate spaces are available for directed fluid flow around the outside periphery of the central part as far as the fluid overflow openings provided in its upper part. Because the support projections which form the channels extend along a helical path, continuous fluid guidance along the tubular support element is prevented. As a result of the aforementioned repeated deflection of the fluid flow, an unfavorable fluid flow characteristic occurs between the support element and the filter unit which encloses it and which is supported on it.

A comparable arrangement is disclosed according to one embodiment as shown in FIG. 3 of WO 01/91881. In this known approach, only a helical channel guide which encompasses the support element is used for fluid transport and for supporting the filter unit within the filter housing. Repeated deflection of the fluid flow around the longitudinal axis of the filter element is unfavorable in terms of energy expenditure. The support projections of the support element which form the helical channel form only a small support surface for the filter unit which is to be supported, so that in this respect reliable support, especially for larger fluid difference pressures, does not take place.

Furthermore, JP-20011293312 A discloses a filter device with a filter unit which is located in a filter housing and in which the support element is provided with a plurality of flow channels located on its outer peripheral side. The channels run in a straight line, and are used for fluid transport within the filter device when oriented to the longitudinal axis of the filter element. In spite of the good support for the filter unit which can be achieved, filtration performance is adversely affected as a result of the known linear fluid guidance.

SUMMARY OF THE INVENTION

An object of the present invention is to provide a filter element for filtration of fluid which permits reliable operation without failure and achieves high filtration performance in a manner favorable in terms of energy expenditure.

This object is basically attained by a filter element with channels extending continuously without repeated deflections of the fluid stream along the respective support element and only partially encompassing the respective support element with the formation of a twisting guide. The support element has longitudinal ribs which border the spiral channels, and which reliably support the filter unit with the assigned filter material during operation of the filter element. At the same time, as a result of the plurality of fluid channels, large amounts of the fluid to be filtered can flow through the filter unit in the direction of the support element.

Since the channels, with their longitudinal ribs which border them, are guided in or extend along spiral tracks or paths in a twisting guide without repeated deflection along the support tube, it has been shown that such a spiral twisting guide accordingly leads to low friction losses in fluid guidance. This arrangement in turn has a beneficial effect on the behavior of flow thorough the filter element in terms of energy expenditure. The pertinent twisting guide is made in the manner of the helical rifling of low incline, as is made in the barrel of a firearm, by which the round is brought into stabilizing rotary motion. The indicated twisting guide therefore allows channel guidance which extends free of repeated deflections along the respective support element in a tilted alignment to its longitudinal axis. With the filter element design of the present invention, different filter tasks can also be carried out, for example, when a copious amount of fluid must be quickly removed from the filter unit of the element by draining to improve the filtration performance.

Preferably the respective support element is formed from a support tube and the respective channels are bordered by the longitudinal ribs of the support tube which project laterally. This arrangement benefits linear fluid guidance. The cavity and flow losses can be kept low in such a way that the filter element in terms of flow behavior is favorable in terms of energy expenditure.

If in one preferred embodiment of the filter element of the present invention, the channels are located both on the inner and outer peripheral side on the support tube. The fluid transport performance can be further improved and, in this way, a support possibility can be found in the two directions for the bordering filter material.

In another preferred embodiment of the filter element of the present invention, the longitudinal ribs may be seated on the support tube in the manner of crosspieces or the longitudinal ribs which are located directly adjacent are connected in pairs to one another. On the outer peripheral side, the ribs form a support surface, and on the inner peripheral side form the base of the groove of the individual channels. Compared to the crosspiece-like arrangement of the longitudinal ribs, the outer peripheral-side support surface in the same manner as the groove base on the inner peripheral side offers a widened contact surface so that consequently improved support for the filter material of the respective filter unit is achieved.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
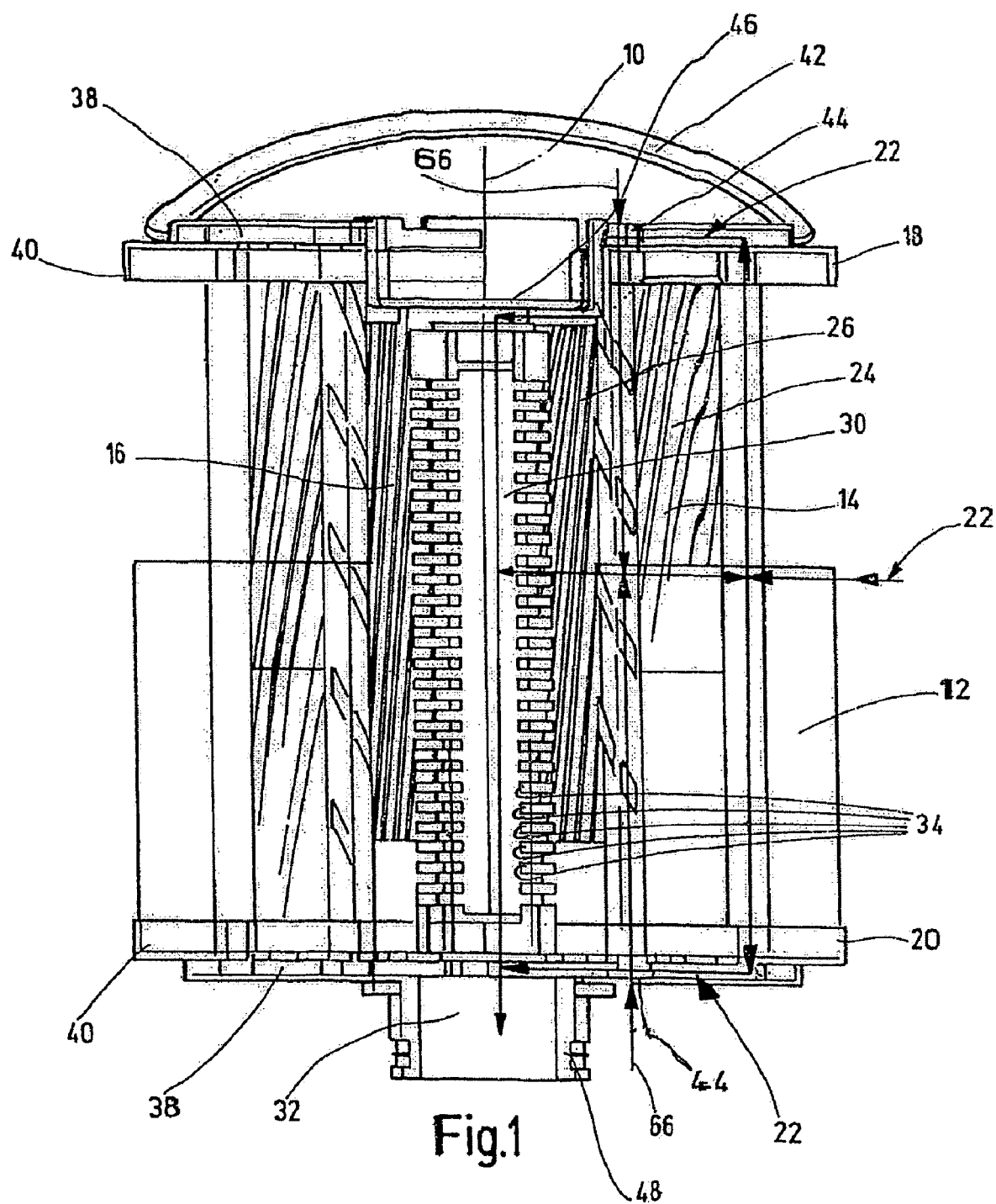
FIG. 1 is a side elevational view in section of a filter element according to a first embodiment of the present invention.

One embodiment of the filter element of the present invention is shown in FIG. 1 in a longitudinal section. The filter element is used for filtration of fluids, especially in the form of dirty hydraulic oil or the like. Three filter units 12, 14, 16 are arranged around the longitudinal axis 10 of the filter element concentrically to form an outer filter unit 12, a middle filter unit 14 and a filter unit 16. For the sake of clarity, the filter unit 12 located outermost has been shown only with half its axial length. The filter units 12, 14, 16 have a radial distance between each other. On the inside, they are held by two cover parts 18, 20 designed as end caps. In particular, the ends of the filter units 12, 14, 16 can be joined to the two cover parts 18, 20 by a bed of adhesive or the like.

Figure 2:
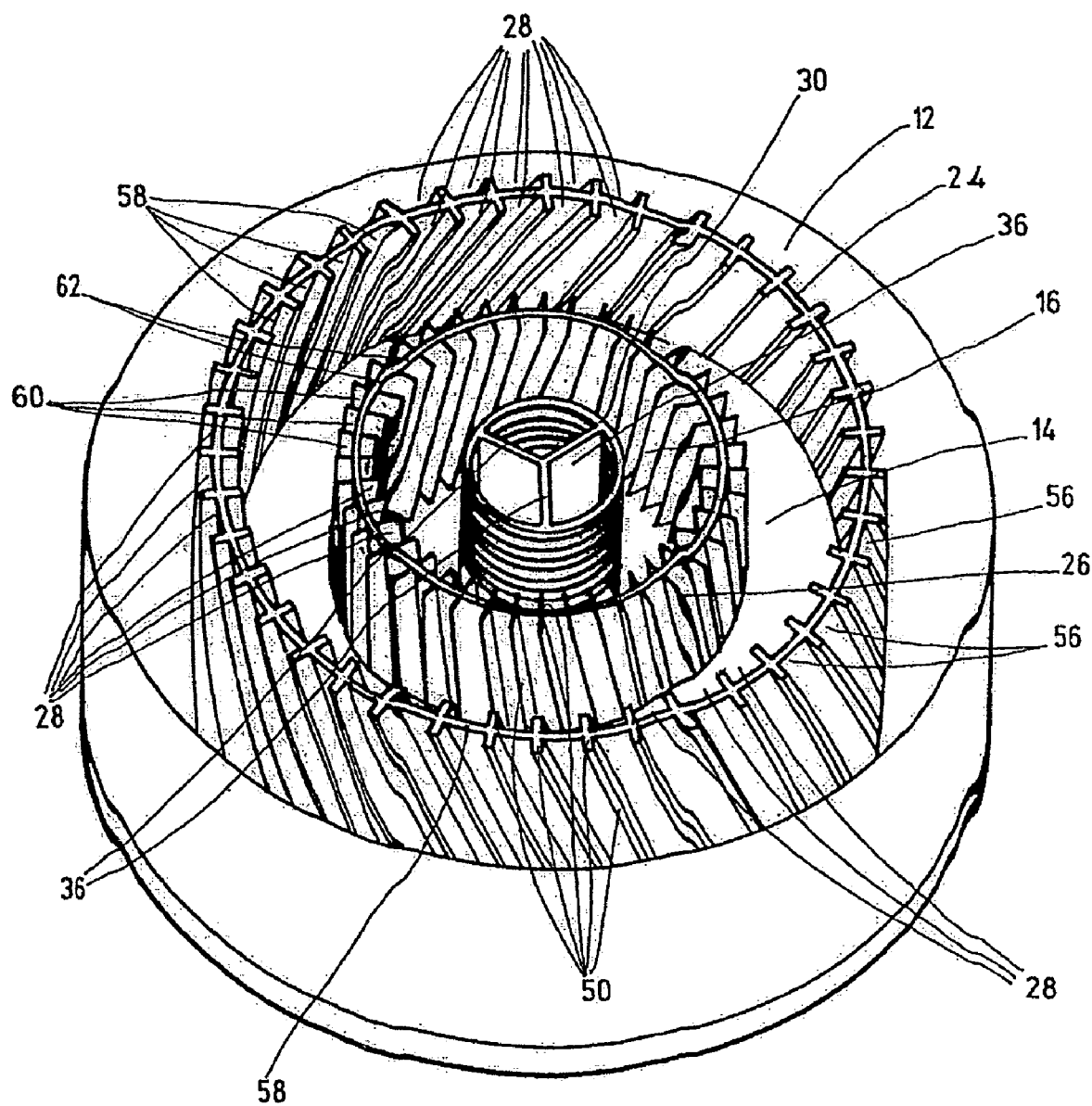
FIG. 2 is a perspective view in schematic form of a top of the filter element of FIG. 1, without the cover parts and without portions of the filter units.

In the cover parts 18, 20, a fluid guide 22 is provided. The type of fluid passage and the type of internal fluid guide 22 are shown in FIG. 1 with the corresponding arrows, flow taking place through the filter element in the direction of the arrow. Furthermore, in the respective distance or space between the filter units 12, 14, 16, a support element 24, 26 is placed as a support and/or drainage tube. Depending on the flow direction of the fluid to be filtered (unfiltered material), at least some of the filter units 12 and 14 which border adjacently are thus effectively supported in the flow-through direction by the respective support elements 24, 26 to prevent bulging of the respective filter unit 12, 14, 16. Furthermore, the support elements 24, 26 are provided with channels 28 as another part of the internal fluid guide 22. The pertinent channels 28 are shown in FIG. 2 for the two support elements 24 and 26, for one embodiment, on the support elements 24, 26.

Figure 3:
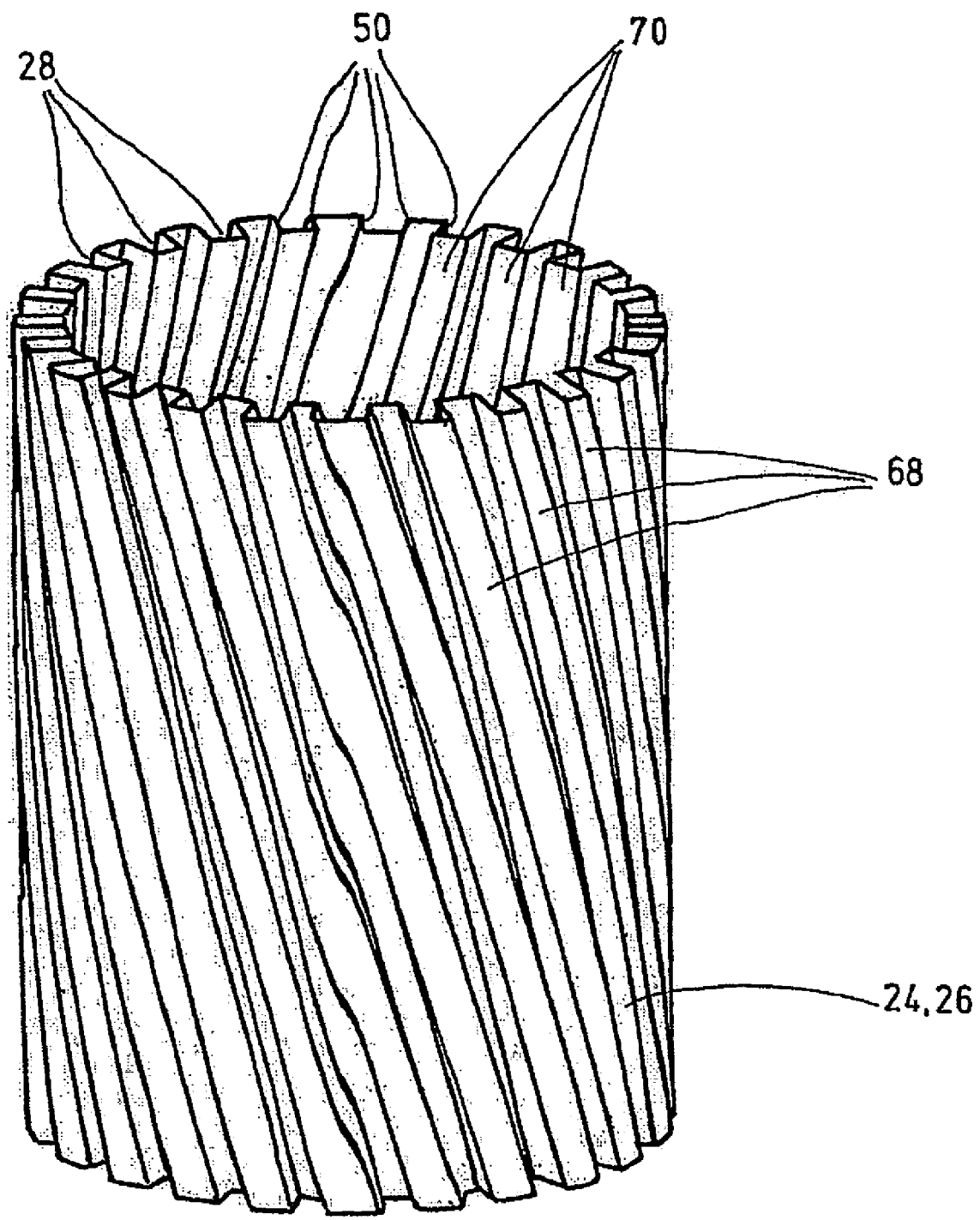
FIG. 3 is a perspective view in schematic form of a second embodiment of one support element in the form of a support tube, relative to the inserted support elements shown in FIG. 2.

Each filter unit 12, 14, 16 is formed from a cylindrical filter mat. The pertinent filter mat may be wound or folded, and is formed of a filter material which is conventional in this field. As furthermore follows from FIG. 1, the respective filter mat is provided with a uniform linear dimension, like the other inserted cylindrical filter mats, measured in the direction of the longitudinal axis 10 of the filter element. The filter unit 16 which is located innermost, as viewed in FIGS. 1 and 2, is supported on the inner peripheral side on a support tube 30. The interior of support tube 30 is connected to the clean side 32 of the filter element (see FIG. 1). The structure of the pertinent support tube 30 is of conventional design and is known from another connection. The support tube includes individual annular segments 34 located on top of one another and bordering the fluid passages for passage of the filtrate between one another. The support crosspieces 36 border over three identical angles therebetween and are kept at a distance from one another (see FIG. 2). Thus the inner, conventionally made support tube 30 supports the innermost filter unit 16 when flow-through takes place in the direction from the outside (compare arrow 22) to the inside. In the embodiment as shown in FIG. 2, there are a total of 40 fluid channels 28 both on the inner and also the outer peripheral side on each of the two support elements 24, 26. Preferably in any case, always more than 20 fluid channels 28 are used for one of the support elements 24, 26. Thus, in the embodiment as shown in FIG. 3 which will be detailed below, there are 24 channels 28 both on the inner peripheral side and on the outer peripheral side.

The cover part 18, the upper one as viewed in FIG. 1, includes essentially two parts 38, 40 which can each be joined integrally to one another. The upper part 38 is provided with a mountable handle 42 designed as a grip in order to remove for example the filter element from the filter housing of the filter device (not shown) when the filter element has been used up and to replace it with a new filter element. The fouled and unfiltered fluid (unfiltered material) can be supplied to the filter element by inlets 44 designed as holes which are arranged diametrically to the longitudinal axis 10. The pertinent inlets 44 extend through the two parts 38 and 40 of the upper cover part 18. The upper cover part 40 is elongated downward in the middle as a shoulder and in the middle encloses a central channel 46 leading to the clean side 32 within the filter element by the support tube 30.

Furthermore, in the upper cover part 18, as part of the internal fluid guide 22, there are flow channels (not shown) which make it possible, as shown in the partial representation in FIG. 1, to accommodate already filtered fluid by the filter units 12 and 14 and to transport such fluid in the direction of the central channel 46 to the clean side 32 of the filter element. The cover part 20, which is the lower one viewed in FIG. 1, is designed accordingly like the upper cover part 18. Instead of the handle 42 however, the lower cover part 20 has the clean side 32 of the filter element which is enclosed by a jacket connection 48.

As shown particularly in FIG. 2, which relates to the first embodiment of the filter element, the two support elements 24 and 26 are made cylindrical. Along their outer and inner periphery, each has longitudinal channels 56, 58, 60, and/or 62 which can be regarded as part of the internal fluid guide 22. Each longitudinal channel 56, 58, 60, and 62 of the respective support elements 24 and 26 is equidistant to the next following longitudinal channel on the inside or outside of the pertinent support element. The longitudinal channels 56, 58, 60, and 62 extend along the longitudinal axis 10 of the filter element and have twists such that a type of twisting guide for the fluid transported is achieved.

The indicated filter element is used for installation in a conventional filter device having an inlet point for the unfiltered fluid and an outlet point for the filtered fluid (not shown).

The operation of the filter element of the present invention is shown using the arrows in FIG. 1.

As viewed in FIG. 1 to the right of the longitudinal axis 10 of the filter element, the internal fluid guide 22 is detailed. By an inlet point which is not detailed in the filter housing for the filter element shown in FIG. 1, the unfiltered fluid or material flows from the outside to the inside through the first or outer filter unit. The contaminants present in the unfiltered fluid or material are then retained in the first filter unit 12. The fluid flow of filtrate is taken up on all sides and on the outer peripheral side by the outer longitudinal channels 56 of the first support element 24 and is discharged in equal parts up and down into the upper cover part 18 and into the lower cover part 20. The filtrate is then taken up into the respective bottom part by the internal fluid guide 22 in the cover parts and transported in the direction of the central channel 46, from where discharge takes place by the middle of the support tube 30 between the support crosspieces 36 in the direction of the clean side 32. At the same time, in the direction of the arrows 66 additional unfiltered material is introduced into the filter element by the filter housing which is not detailed, specifically by the inlets 44 which are separated fluid-tight from the other internal fluid guides within the cover parts 18, 20.

The unfiltered material which is supplied by the inlets 44 travels by the upper cover part 18 and the lower cover part 20 into the longitudinal channels 60 and 62 of the second support element 26. The pertinent unfiltered material is then sent uniformly in both directions, in one direction through the inner third filter unit 16 and the other direction through the middle filter unit 14. The latter stream of filtrate is then transported in turn by the inner guide channels 58 of the first or outer support element 24 into the cover parts 18, 20 and in turn travels by the internal cover fluid guide to the clean side 32 of the filter element, as described. The other branched filtrate flow then travels by the third filter unit 16 into the interior of the support tube 30 and from there likewise to the clean side 32 of the filter element. The pertinent internal fluid guide 22 is shown by example for one flow path, this taking place, as described, radially on the outer peripheral side along the individual filter units 12, 14, 16 and the support elements 24, 26.

By the concentric arrangement of several filter mats around the support tube 30 and by one drainage tube in the form of support elements 24, 26 each being located between two filter mats, the available installation space in the filter housing of a filter device (not shown) is more effectively used. An increase of the dirt-holding capacity thus can be achieved. The flow resistance of the filter element is accordingly reduced by the enlargement of the filter area so that the entire filter element can be characterized as favorable in terms of energy expenditure for the throughflow process. As shown, some of the drainage tubes are designed to supply the filtered fluid in the two end caps in the form of cover parts 18, 20. Another part is designed to supply the unfiltered fluid (unfiltered material) from the two end caps to the filter mats. The indicated drainage tubes as support elements 24, 26 which in the same way as the support tube 30 form a support function for the respective filter units 12, 14, 16, can be made as shown in FIG. 3 also in the manner of a corrugated tube or also as rings which are stacked on top of one another with holes (not shown). Due to the indicated arrangement as shown in FIG. 1, it applies to each drainage tube that the pressure on its inside corresponds to the pressure on its outside so that for the filter element overall a pressure-compensated arrangement is achieved. This arrangement has a beneficial effect on the service life of the filter element.

In a different embodiment of a support element 24, 26 shown in FIG. 3, the longitudinal ribs 50 are arranged directly adjacent, and are connected to one another in pairs. On the outer peripheral side, ribs 50 form a support surface 68. On the inner peripheral side, ribs 50 form a groove base 70 of the individual channels 28. Opposite the crosspiece ends of the longitudinal ribs 50 according to the first embodiment as shown in FIG. 2, the supporting contact surfaces for the respective filter units 12, 14, 16 are consequently elevated by the support surfaces 68 and the groove base 70. This arrangement suggests that the embodiment shown in FIG. 3 is especially well suited if the pertinent filter units and filter materials are exposed to high compressive stresses and compressive stress cycles as the fluid flows through.

The embodiment as shown in FIG. 3 can be combined with the embodiment of FIG. 2 for a filter element, for example by the embodiment of FIG. 3 forming the innermost support element 26 and the arrangement with the raised longitudinal ribs 50 forming the outermost support element 24. But two or more support elements according to the embodiment of FIG. 3 arranged concentrically to one another can also form a drainage tube system for a filter element. If, depending on the filtration task, this should be necessary, the respective support element 24, 26 can also be provided with perforations which are not detailed, in order to achieve fluid passage transversely to the longitudinal axis 10 of the filter element in this way. The pertinent perforations (not shown) may penetrate the channels 28, but also in the embodiment as shown in FIG. 3 the support surface 68 along with the groove base 70. The support element 24, 26 which is designed as a corrugated tube as shown in FIG. 3 can also be easily obtained as an extrusion part from plastic material.

While various embodiments have been chosen to illustrate the invention, it will be understood by those skilled in the art that various changes and modifications can be made therein without departing from the scope of the invention as defined in the appended claims.

What is claimed is:

1. A filter element for filtering fluids, comprising:
   outer, middle and inner filter units arranged concentrically about a longitudinal axis;
   outer, middle and inner support elements arranged concentrically about said longitudinal axis and disposed in an alternating succession with said filter units, said outer, middle and inner support elements supporting and partially engaging said outer, middle and inner filter units, respectively, in directions of fluid streams therethrough;
   fluid receiving channels on a side of each of said middle and outer support elements facing the respective filter units, said channels being bordered laterally by longitudinal ribs on said support elements, extending along spiral tracks on said outer and middle support elements and having two free ends emerging on opposing ends of said middle and outer support elements, said channels extend continuously without repeated deflections of fluid streams therein and only partially encompassing the respective support elements forming a twisted guide for fluid flow; and
   conduits convey fluid to be filtered from outside said outer and inner filter units to inner clean sides thereof and from one side of said middle filter unit to an opposite clean side thereof.

2. A filter element according to claim 1 wherein
   each of said support element is formed from a support tube.

3. A filter element according to claim 2 wherein
   said channels are on both inner and outer peripheral sides of said outer and middle support elements.

4. A filter element according to claim 3 wherein
   said longitudinal ribs are formed as crosspieces on said support tubes.

5. A filter element according to claim 3 wherein
   directly adjacent ones of said longitudinal ribs are connected in pairs on said outer peripheral sides to form support surfaces and on said inner peripheral sides to form bases of grooves of said channels.

6. A filter element according to claim 3 wherein
   said inner support element has passages forming a channel guide for fluid flow.

7. A filter element according to claim 1 wherein
   each said filter unit comprises a cylindrical mat of essentially equal linear dimensions in directions parallel to said longitudinal axis.

8. A filter element according to claim 1 wherein
   at least one of said outer and middle support elements has at least 20 of said channels forming a common fluid guide.

9. A filter element according to claim 8 wherein
   said channels are tilted at an angle between 10° and 30° relative to a line parallel to said longitudinal axis.

10. A filter element according to claim 9 wherein
    said angle is 15°.

11. A filter element according to claim 1 wherein
    said outer and middle support elements prevent fluid flow therethrough, limiting flow along surfaces thereof.

* * * * *